United States Patent [19]

Vernon

[11] E Patent Number: Re. 32,176

[45] Reissued Date of Patent: Jun. 10, 1986

[54] UNITIZED AIRCRAFT FOOD AND BEVERAGE SERVICE

[75] Inventor: Richard L. Vernon, Rancho Bernardo, Calif.

[73] Assignee: Lockheed Aircraft Corporation, Burbank, Calif.

[21] Appl. No.: 648,184

[22] Filed: Sep. 6, 1984

Related U.S. Patent Documents

Reissue of:

[64] Patent No.: 3,517,899
Issued: Jun. 30, 1970
Appl. No.: 718,691
Filed: Apr. 4, 1968

Which Was Subject of:

Reexamination Certificate No: B13,517,899
Issued: Jan. 25, 1983
Reexamination Request No.: 90/000,144
Filed: Jan. 27, 1982

[51] Int. Cl.[4] ..... B64D 11/04
[52] U.S. Cl. ..... 244/118.5; 186/40
[58] Field of Search ..... 244/118.5; 186/40; 105/327

[56] References Cited

U.S. PATENT DOCUMENTS

| | | | |
|---|---|---|---|
| 1,867,568 | 7/1932 | Hirshfield | 187/3 |
| 2,761,637 | 9/1956 | Brumby et al. | 244/118.5 |
| 3,517,899 | 6/1970 | Vernon | 244/118.5 |

FOREIGN PATENT DOCUMENTS

| | | |
|---|---|---|
| 484488 | 7/1952 | Canada . |
| 1126908 | 4/1962 | Fed. Rep. of Germany . |

*Primary Examiner*—Trygve M. Blix
*Assistant Examiner*—Rodney Corl

[57] ABSTRACT

Food and beverage service can be provided in a comparatively short period to all of the passengers in a large aircraft through the utilization of a plurality of wheeled food and beverages service units. These serving units are separately loaded to contain some food and beverage items and then are stored in a kitchen area of an aircraft. Other items to be served to the passengers are stored loaded within ovens, cold storage units and an ice source in the aircraft. As the aircraft is in flight those items to be given to passengers not already on or in the individual serving units are transferred to these units. Then these serving units are transported to passenger areas of the aircraft and the individual passengers are served. After such service the separate serving units are used to store items remaining after the passenger needs have been satisfied and are returned to the kitchen area for storage until the aircraft is landed.

12 Claims, 6 Drawing Figures

UNITIZED AIRCRAFT FOOD AND BEVERAGE SERVICE

Matter enclosed in heavy brackets [ ] appears in the original patent but forms no part of this reissue specification; matter printed in italics indicates the additions made by reissue.

BACKGROUND OF THE INVENTION

For reasons which are relatively unimportant in the present invention over the years there has been a gradual increase in the size of passenger-carrying aircraft. At this time aircraft capable of carrying in excess of about 200 passengers on a regular, established commercial basis are in the process of being designed and constructed, and it is contemplated that within a comparatively few years such so-called "flying busses" will be in regular use.

One of the major problems which has plagued passenger carriers in the aircraft field is the problem of providing food and beverage service to aircraft passengers as an aircraft is in flight. It is considered by such carriers that food and beverage service is exceedingly desirable if not essential for competitive reasons. Yet it is also acknowledged by them that such service involves a number of economic considerations.

In any aircraft there is only a limited amount of floor or deck space which can be utilized to carry passengers. As a result of this, in prior aircraft used for passenger purposes the amount of space available to carry passengers has been effectively reduced by utilizing certain of this space as a kitchen-type area for food and beverage storage and preparation. Normally, such items as food and beverages furnished to passengers have been carried from such a kitchen-type area to the individual passengers by stewardesses during the time the aircraft is in flight, and dirty dishes and trash have been returned to the same kitchen-type area for storage after the needs of the passengers have been satisfied. On a few occasions various carts, such as collapsible carts, have been used in aiding in the service of certain specific items to the individual passengers.

Such kitchen-type areas have frequently been located where they can be observed by passengers. This is considered to be undesirable since an airline normally does not desire to have its passengers observe and/or interfere with the various activities involved in serving food and beverages and in collecting the trash and dirty service items remaining after such service. Also, in certain aircraft the kitchen-type areas used for food and beverages are located so as to be serviced with new food and other items through the same door used for loading and unloading passengers. Such dual use tends to increase the amount of time an aircraft is on the ground.

From an economic standpoint the type of food and beverage service procedure indicated in the aforegoing is disadvantageous. The space used as a kitchen area obviously cannot be used to carry revenue producing passengers. The amount of labor required to carry dishes and other items to and from a kitchen area in a comparatively large aircraft is considered to be unnecessarily large. Further, it is considered that kitchen areas have in general been located in what may be considered as undesirable locations. In many prior aircraft it is considered that the locations of such kitchen areas have tended to reduce the economic return from the use of an aircraft by requiring a comparatively long aircraft turn-around period.

As a result of these considerations it is considered that there is a definite need to improve the manner in which aircraft passengers are supplied with food and beverages during the flight of an aircraft. It is also considered that this need is related to an economic need to handle the food and beverage service problem in such a manner so as to conserve passenger-carrying space within the aircraft, in such a manner as to tend to minimize the amount of labor necessary to accomplish such service, and in such a manner as to facilitate the servicing of the aircraft.

SUMMARY OF THE INVENTION

An object of the present invention is to provide food and beverage service aboard an aircraft in such a manner as to satisfy these needs. A more specific objective of the present invention is to develop a type of "unitized" food and beverage service in an aircraft which does not significantly detract from the passenger-carrying capacity of an aircraft. A further objective of this invention is to provide such food and beverage service in an aircraft in such a manner as to tend to minimize the amount of labor necessary to accomplish such service.

Still another objective of the present invention is to provide food and beverage service in an aircraft in such a manner that individual passengers can be easily and conveniently served at a comparatively nominal cost within a relatively short period. A still further objective of this invention is to provide aircraft in which the kitchen area is separated from the normal passenger area and is located so as to be normally serviced through a separate door when the aircraft is on the ground.

These various generalized objectives of this invention are accomplished through the use of a "unitized" type of concept based upon the use of a plurality of food and beverage service units. These units are of such a dimension as to be capable of being wheeled through the passenger areas of an aircraft, and are constructed in such a manner that food and beverages can be served or dispensed from them to the individual passengers as they are being moved through the passenger compartment. They also are constructed in such a manner that items remaining after such food and beverage service may be stored in them as the service units themselves are circulated amongst the passengers and then are stored in their initial location.

In accordance with this invention this location is below the deck or level of an aircraft used to carry passengers. This is considered quite important. Current governmental regulations make it impractical to increase aircraft seating capacity by installing seats in the bottom of an aircraft. As a result of this the lower area of an aircraft fuselage in a comparatively large aircraft, while utilized for baggage and cargo contains available space which may be utilized to increase the revenue producing passenger payload of the aircraft.

The concepts of this invention involve locating a kitchen area in the lower portion of an aircraft and connecting this area to the normal passenger deck of the aircraft by elevator means. A door is preferably provided to provide separate access to this kitchen area, such a kitchen-type area is constructed so that the food and beverage service units employed may be stored in it in a sequential manner so as to be capable of being withdrawn from the kitchen area, up through the elevator means to the passenger area in the sequence in which various specific items are to be served to the passengers. Certain of these service units are constructed so that separate items such as items held under cold storage or items heated in an oven may be transferred to them as they are being removed from the kitchen area to be circulated as indicated.

From this it will be seen that the invention involves aircraft structures in which a kitchen, or kitchen-type area, is located in the lower portion of an aircraft fuselage; is constructed so as to contain movable food and beverage service units; and is constructed so as to be capable of supplying various items to these units as they are being employed. Such an aircraft structure also includes elevator means for transporting these individual service units to and from the passenger area of the aircraft as the aircraft is in flight. This invention however also involves a process of supplying the food and beverage needs of the passengers within the passenger area while circulating such units from the kitchen area to the passenger area and then back to the kitchen area.

BRIEF DESCRIPTION OF THE DRAWINGS

Further details of the present invention as well as various advantages of it will be apparent from a detailed consideration of the remainder of this specification and the accompanying drawings in which.

Figure 1:
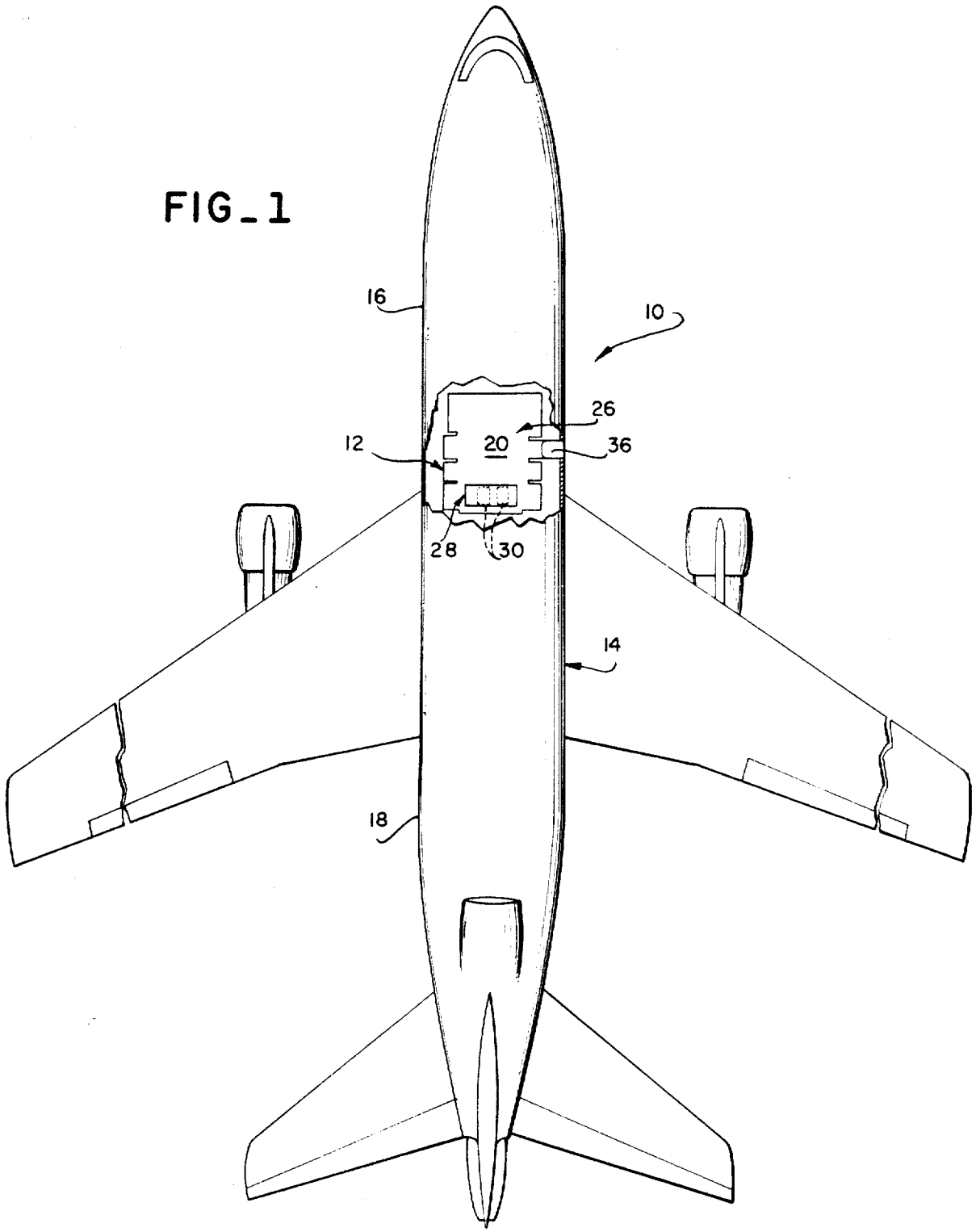
FIG. 1 is a top plan view, partially in section, of an aircraft employing a unitized kitchen and food service area in accordance with this invention.
Figure 2:
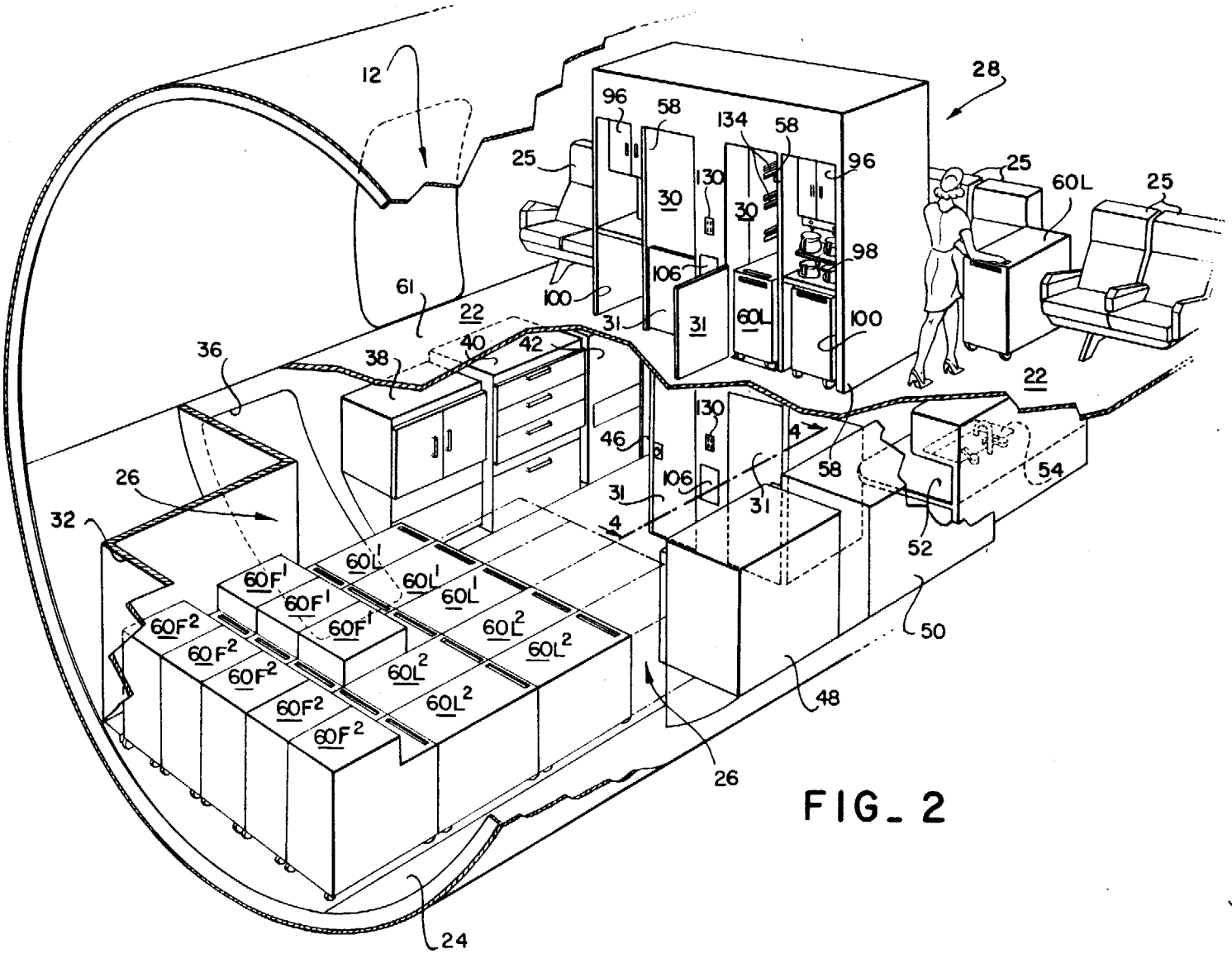
FIG. 2 is a perspective view, partially in section, and partially broken away, indicating the kitchen area in the aircraft shown in FIG. 1 and indicating a food service area employed with this kitchen area.
Figure 3:
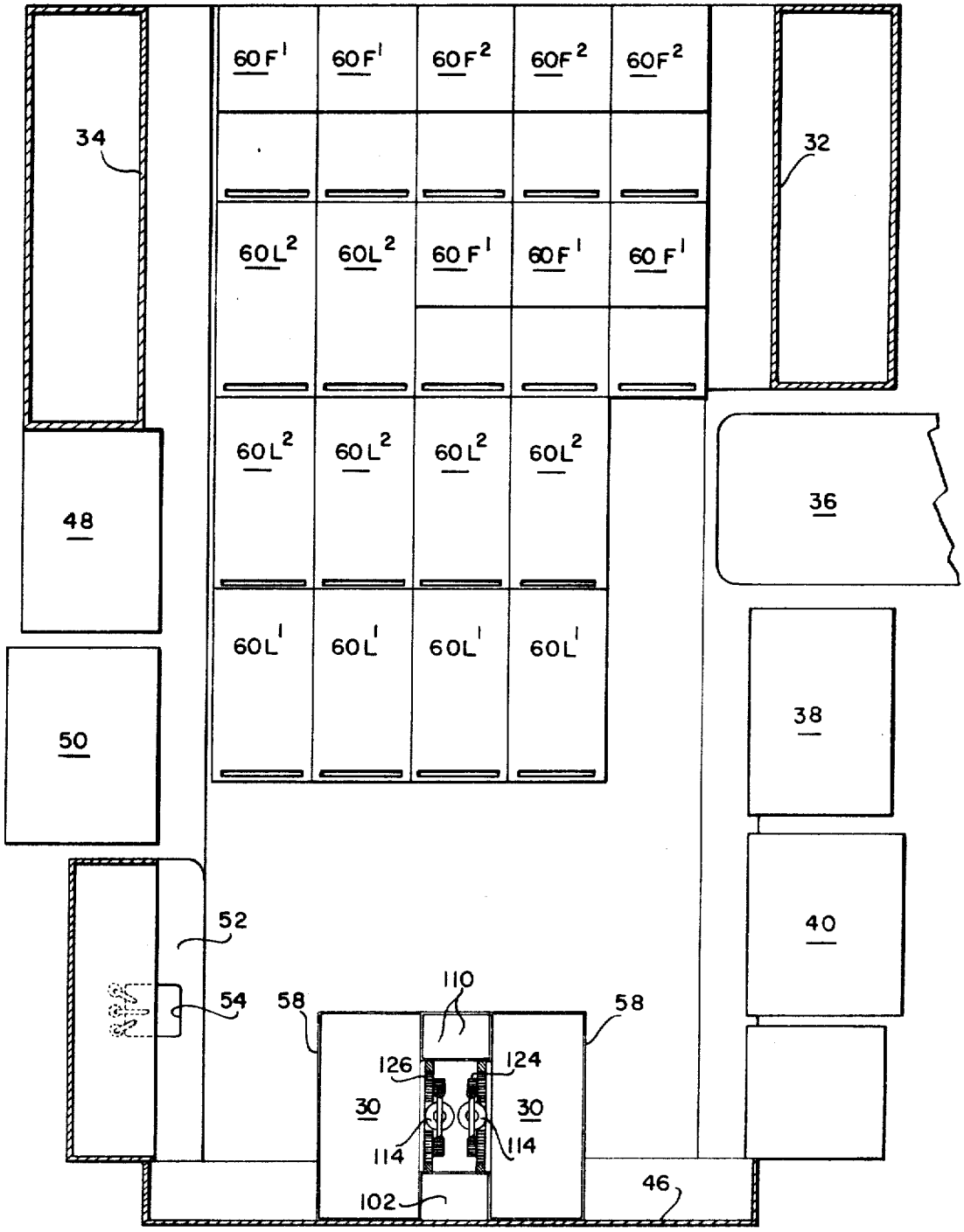
FIG. 3 is a top plan view of the kitchen area shown in the preceding figure.
Figure 4:
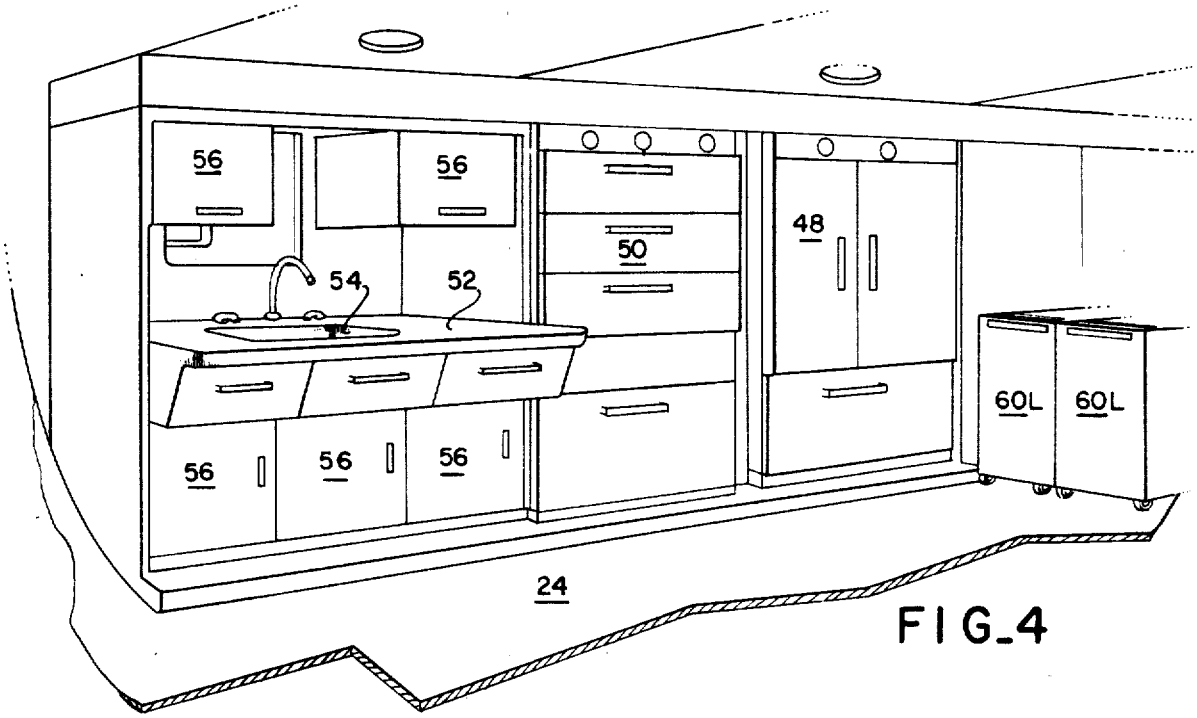
FIG. 4 is a partial perspective view indicating a wall section of this kitchen area.

The various views of the drawings are intended to clearly illustrate a presently preferred embodiment of this invention. Those skilled in the field of passenger service in aircraft will realize that through the use of routine engineering skill or ability the precise structures illustrated may be modified or changed without departing from the essential nature of this invention so that these concepts may be applied to different types of aircraft or to satisfy certain specific service needs.

DETAILED DESCRIPTION OF THE PREFERRED EMBODIMENT

In the drawings there is shown a complete aircraft 10 of a type sometimes referred to as a "flying bus" which is adapted to contain a large number of different passengers. In the specific aircraft 10 a unitized kitchen area and food service area 12 is utilized so as to separate the fuselage 14 of the aircraft into forward and aft sections 16 and 18. This fuselage 14 is provided with a more or less centrally located floor 20 which divides into an upper area or deck 22 and a lower area or deck 24. In the aircraft 10 the passengers normally ride in seats 25 on the upper deck 22.

As a result of this space in the upper deck 22 in the aircraft 10 is at a premium. It is normally desired to carry as many passengers as possible on this upper deck 22 so as to achieve the maximal economic return from the use of the complete aircraft. To do this it is necessary to limit to as great an extent as possible the service areas on the upper deck 22 so as to produce a maximum revenue by carrying passengers. This consideration has made it extremely important to remove to as great extent as reasonably possible kitchen facilities such as are commonly used in aircraft for the purpose of satisfying the refreshment and food needs of passengers from the upper deck 22.

Figure 6:
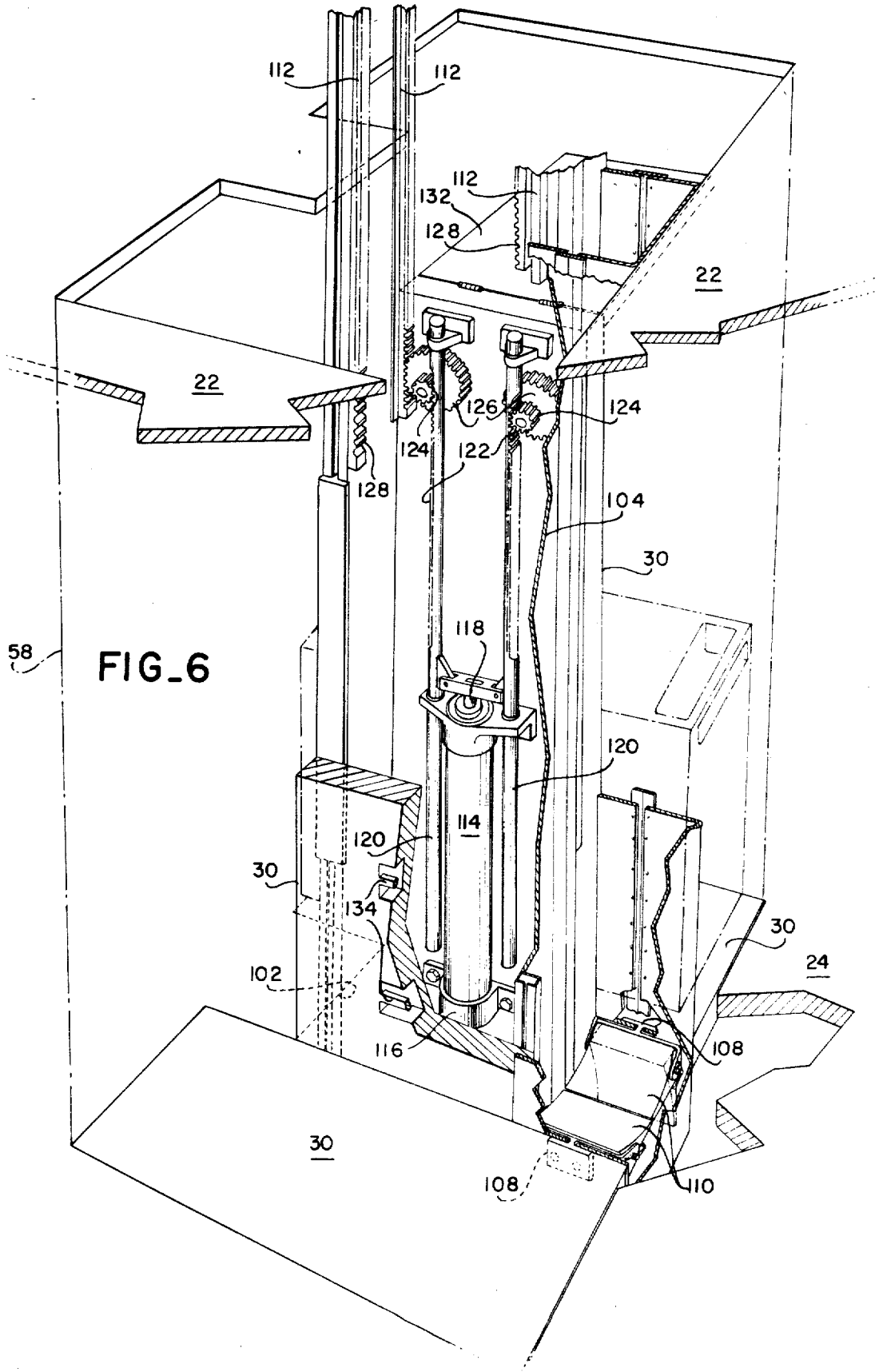
FIG. 6 is a perspective view, partially broken away, indicating the connection between the kitchen area and the service area employed with this invention.

With the present invention this is accomplished by dividing the unitized kitchen area and food service area 12 into two different separate areas—a kitchen area 26 and a food service area 28. These two areas 26 and 28 are located so that the kitchen area 26 is located on the lower deck 24 in such a manner that it cannot and will not occupy space on the upper deck 22 capable of being occupied by revenue-producing passengers. On the other hand the food service area 28 is located on the upper deck 22 so as to provide for service needs which require immediate attention and which cannot be conveniently referred back to the kitchen area 26. These two areas 26 and 28 are connected by elevators 30 as are indicated in FIG. 6 of the drawing. Access to these elevators is made available through doors 31.

The complete unitized kitchen area and food service area 12 is preferably located so that the food service area 28 on the upper deck 22 divides this upper deck 22 and so that the portion of it within the section 16 contains one type of passenger, such as the so-called first class passenger who is expected to receive one type of treatment aboard the aircraft 10 and so that the portion of it within the section 18 contains another type of passenger such as the so-called tourist or second class passenger who is expected to receive another lesser degree of service within the aircraft. The invention, however, is equally applicable and can be readily utilized in aircraft where all passengers receive the same or substantially the same type of treatment.

In the aircraft 10 the kitchen area 26 is essentially a somewhat elongated storage room having walls 32 and 34 located parallel to one another. The wall 32 may conveniently be provided with a known type of service door 36 utilized in taking food and related items into the aircraft and in removing trash and the like from this aircraft. This door 36 may be utilized to take items into and out of the aircraft 10 without interfering with passenger movement in this aircraft. This is considered to be significant in reducing the so-called turn-around time of the aircraft 10 when it is on the ground. The location of the kitchen area 26 on the lower area or deck 24 makes this kitchen area inaccessible to passengers. This is also considered to be desirable.

Adjacent to this door 36 there is located in the wall 32 cold storage unit 38. Adjacent to it there is located an oven unit 40; next adjacent to this oven unit 40 there is located a known type of icemaker and ice storage unit 42. This storage unit 42 terminates adjacent to a wall 46 in the kitchen area 26. On the wall 34 nearly opposite the cold storage unit 38 there is located another similar cold storage unit 48; next to it there is located another corresponding oven unit 50. A work table counter unit 52 containing a sink 54 is located between the oven unit 50 and this wall 46. Appropriate conventional storage cabinets 56 are located both above and below this counter unit 52 for storing various items needed in conjunction with the entire kitchen and food service area 12.

It will be noted that the elevators 30 are located adjacent to the forward wall 46 so as to be spaced between the work table 44 and the counter unit 52, allowing ready access to both this table 44 and the counter unit 52. The elevators 30 are, of course, surrounded by an appropriate protective wall 58. It will also be noted that the curvature of the aircraft 10 has been utilized so as to locate the units 28, 40, 42, 48, 50 and 52 at a convenient more or less waist-high level.

In the kitchen area 26 a plurality of separate wheeled serving units 60L and 60F sufficient to supply the food and beverage needs of the passengers on the aircraft 10 are normally stored so as to be positioned remote from the forward wall 46 in a sequence or order corresponding to the sequence or order in which these units will be utilized. These units indicated by $60L^1$ in the drawings are intended to contain beverages sufficient to suffice for the first class passengers within the aircraft. Those units marked $60L^2$ are sufficient to supply the beverage needs of the lesser class passengers within this complete aircraft.

It will be noted that these $L^1$ and $L^2$ service units 60L are located more closely adjacent to the elevators 30 than the other units 60 in a position where they may be easily filled with ice from ice unit 40 when they are to be utilized. During such utilization ice from the ice unit 42 is located within them and they are individually transported in the elevators 30 to the upper deck 22 where they are wheeled between the individual passengers. When so used they may be temporarily located in various areas of the upper deck 22 which are not utilized when the aircraft 10 is in flight so as to be stored there temporarily. Such areas can be conventional boarding areas or aisles 61 or the like in the aircraft.

After the various units 60L have been circulated among the passengers as described the remaining units 60F marked by the letters $F^1$ and $F^2$ are accessible. Further, the movement of the units 60L in the manner described given sufficient room in the kitchen area 26 so that a person working in this area can have access to the cold storage units 38 and 48. Access is simultaneously available to the oven units 40 and 50. The individual service units 60F are intended to be utilized in supplying the food needs of the passengers upon the upper deck 22. Those units $60F^1$ are intended to be utilized by the so-called first class passengers and those marked $60F^2$ are intended to be used in satisfying the needs of the passengers of the lesser class.

Figure 5:
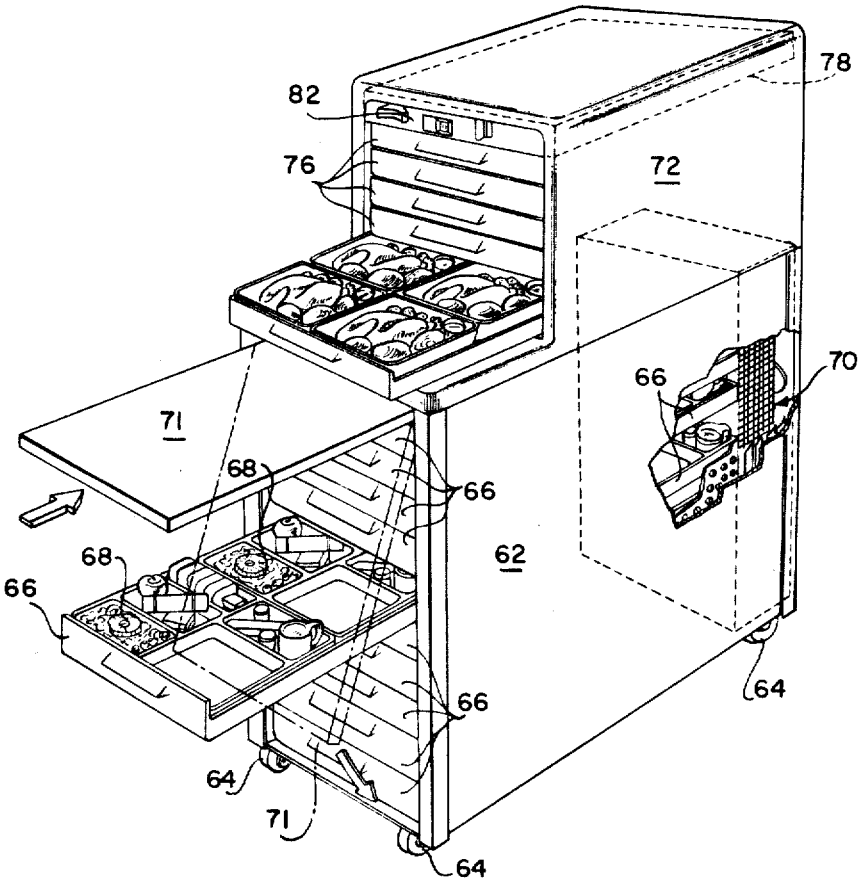
FIG. 5 is a perspective view of a combined food service unit used with this invention, this view being partially broken away to indicate an aspect of the construction of one of the units in the combined unit.

The construction of the various service units 60F intended to be utilized in supplying food is best illustrated in FIG. 5 of the drawings. Here it is seen that each of these units 60F consists of a housing 62 mounted on wheels 64. Each of the housings 62 contains a plurality of elongated drawers 66 each of which contains a plurality of individual food service trays 68 containing some food items and various food cutlery, napkins and related items. These trays 68 are best kept at a lightly refrigerated temperature so as to prevent deterioration of the food items upon them.

For this purpose each of the service units 60F is provided with a refrigeration unit 70 preferably consisting of a cryogenic system which cools the air within the interior of the housing 62 throughout the use of a service unit 60F. The drawers 66 fit in such a manner that the escape of such cooled air is normally prevented. These drawers 66 are normally covered by a door 71 which is capable of being rotated upwardly and slid within a service unit 60F when it is desired to have access to the drawers 66. Each of the food service units 60F also preferably includes a superimposed housing 74 containing drawers 76 corresponding to the drawers 66, but of smaller length than the drawers 66. When the service units 60F are supplied to the aircraft on the ground these drawers 76 are normally empty.

During the utilization of a service unit 60F this unit 60F is moved so that it is accessible to either of the cold storage units 38 and 48 and either of the oven units, 40 and 50. Food or dishes are transferred from the cold storage units 38 and 48 to the individual trays 68 as required and the food is also transferred from the oven units 40 and 50 to the drawers 76 as required. After this is done the individual service unit 60F can be transferred to the upper deck 22 through the use of the elevators 30.

There a hostess or other person attending to the needs of the passengers may circulate the service units 60F among the individual passengers. In so doing such an individual will, upon reaching each passenger, take a hot dish from one of the drawers 76 and insert it on one of the trays 68 and then give the filled tray 68 to the passenger. By virtue of this offset construction of the housing 74 with respect to the housing 62 this may be conveniently accomplished with a minimum of difficulty.

As a service unit 60F is being used in this manner, the various units 60L may be returned to the lower deck 24 from the upper deck 22 through the elevators 30 so as to be stored in the areas or portions of the kitchen area 26 originally used to contain the service units 60F. Then following use of these service units 60F they may be returned in the same manner after the individual trays 68 have been relocated within them.

During the use of these units 60L and 60F various auxiliary service functions occasionally must be performed. The food service area 28 contains individual storage areas 96 which are adapted to contain various supplies needed for such secondary type service. They may also contain coffee makers 98 so that the passengers in the aircraft 10 may be supplied with fresh coffee. If desired coffee can be supplied to passengers through the use of service units similar to the units 60F and 60L.

Preferably each of the storage compartments 96 is provided with a lower storage space 100 of such dimension as to easily contain one of the service units 60L in case it should be desired to supply passengers with liquid refreshment either during or after food service.

It will be noted that the wall 58 in effect extends between the decks 22 and 24 and that the storage units 96 are located on the outside of the wall 58 on the decks 22. The individual elevators 30 employed are in effect surrounded by this wall 58 so that it constitutes the elevator shafts. However, the elevators 30 are separated from one another by vertically extending space 102 located between these elevators. This space 102 may contain an interior wall 104 extending between the individual elevators which can be viewed through trash doors 106 located both in the food service 28 and the kitchen area 26.

Each of the elevators 30 carries a bracket 108 which in turn pivotally carries a compactor 110. These compactors 110 are mounted on the brackets 108 so as to swing freely to an essentially vertical position as an elevator 30 is moved upwardly. The compactors 110 are of such a nature, however, that when their under surfaces contact trash which has been inserted in the upper trash doors 106 they will swing horizontally as shown in FIG. 6 and will be held in such position by the brackets 108 so as to tend to compact such trash during downward movement of the elevators 30 to which they are attached.

Because of the nature of an aircraft it is considered that a conventional elevator operative mechanism is not suitable for use in raising and lowering one of these elevators 30. For this reason each of the elevators 30 is mounted within appropriate guides 112 so as to be capable of being moved through the operation of a hydraulic cylinder 114. One of these cylinders 114 is provided for each of the elevators 30. Each cyclinder 114 has an end 116 rigidly mounted to the elevator 30 and a movable ram 118 mounted vertically. Each ram 118 carries push rods 120 provided with gear racks 122. Guides 123 secured to the elevators 30 stabilize the movement of these rods 120. These gear racks 122 mesh against small pinion gears 124 secured to spur gears 126. These gears are mounted on the elevators 30. The spur gears 126 mesh with other gear racks 128 secured to the aircraft 10.

By virtue of this construction whenever appropriate conventional controls 130 are operated these cylinders 114 are used to raise and lower the elevators 30 in such a manner that cables or similar vibrating elements will not cause difficulty. If, for any reason, the hydraulic power within the aircraft 10 should fail the controls 130 can be operated so as to exercise a throttling effect so that the individual elevators 30 are returned to positions opposite the lower deck 24. When this happens the ceiling 132 on these elevators may be opened so as to permit access to the interiors of the elevators 30. At such time notches 134 in the elevators 30 may be used essentially as steps of a ladder to provide communication between the kitchen area 26 and the food service area 28.

From the preceding portions of this description it will be apparent that the aircraft 10 is constructed in such a manner as to conserve space in the upper deck or area 22 for revenue-producing purposes. This is accomplished by locating the kitchen area 12 beneath the deck 22 in the lower area or deck 24 in what may be referred to as the bottom of the complete aircraft. Because of appropriate safety regulations such as are imposed by governmental authorities it is not now considered practical to carry passengers on this lower area or deck 24. The number of uses to which this lower area or deck 24 can be placed are relatively limited, and the space within it can essentially be regarded as available space, even though it can be used for such purposes as baggage or the like. In effect the location of the kitchen area 26 on the deck 24 captures space for revenue-saving purposes which normally would not be as effectively utilized.

The location of the kitchen area 26 on the deck 24 has a number of distinct advantages even beyond this particular type of advantage. This kitchen area 26 can be serviced as necessary when the aircraft 10 is on the ground through the use of the door 36 without such servicing interfering with the loading or unloading of passengers. This is considered to tend to reduce the time an aircraft must be on the ground between flights. Because the kitchen area 26 is located away from the region in the aircraft 10 normally occupied by passengers, such passengers cannot observe the kitchen area and/or interfere with the various operations performed in it.

The various wheeled service units 60L and 60F employed in the aircraft 10 are normally stored in this kitchen area 26 so that they are literally out of the way and so that they definitely do not interfere with the passenger revenue-producing potential of the aircraft 10. These units 60L and 60F when stored in the kitchen area 26 are located so that only a few of these units at any one time can be "serviced" or filled with required items from the cold storage units 38 and 48 and the oven units 40 and 50 and the ice unit 42. As a result of the constructions employed, the various units 60L and 60F can be serviced from the cold storage units 28 and 48; the ovens 40 and 50 and the ice unit 42 with the person doing the servicing moving minimum distances.

When various hot and cold items (and/or ice) are located on the units 60L and 60F, these units 60F may be easily and conveniently transported by the elevators 30 to the deck 22 where they may be moved down the aisles between the seats 25. When opposite any particular seat 25 appropriate item or items to be given to a passenger in such seat may be conveniently removed from a service unit 60L or 60F.

Further, after such use these units 60L and 60F may be stored in necessary, but normally unused, areas of the plane 10 such as boarding aisles and the like while passengers are given items from other service units 60L and 60F. After items have been dispensed from them these units 60L and 60F are of such a category that glasses, trays and the like may be placed upon them after having been used. These units 60L and 60F are normally reloaded with such items as they are referred to locations adjacent the passengers. Then the units 60L and 60F may be restored to their original positions in the kitchen area 26 through the use of the elevators 30.

The particular service units 60F are considered to be particularly advantageous because of the construction of these units. As loaded on the aircraft 10 the drawers 66 on these units 60F are normally filled. As they are being loaded and stored the refrigeration units 70 within them will maintain the drawers 66 and the trays 68 at a proper storage temperature as determined by the nature of the food items upon them. These trays 68 will also be maintained at this temperature by the refrigeration units 70 until they are delivered to the passengers. On the ground the cold storage units 38 and 48 and the ovens 40 and 50 will normally be filled with appropriate items to be served to the passengers.

During use of the service units 60F those items from within the cold storage units 38 and 48 will normally be located on the trays 68 within the housing 62 where they will also be maintained at a lower than normal temperature during the comparatively short interval until they are delivered to a passenger. As a result, such items from the cold storage units 38 and 48 will normally be serviced to a passenger at what may be regarded as a "proper" temperature.

The items from within the oven units 40 and 50 may be transferred to the drawers 76 in the housing 74 in the kitchen area 26 and may be maintained at a desired elevated serving temperature within this housing until they are taken out of it and located on the trays 68 as these trays are delivered to passengers. As a result of this the hot items served will always be at substantially a desired temperature as they are delivered to the passengers.

To a degree these factors may seem insignificant, but as a practical matter they are very significant. Frequently various air carriers compete against one another for passenger patronage primarily on the basis of other factors than the mere cost of transportation. As a result, if a passenger is more satisfied with the food and beverage service on one carrier than on another such a person is most apt to patronize the carrier that pleases him best. It is considered that the manner in which the food is served on an aircraft such as the aircraft 10, is such as to lead towards a favorable impression with any passenger.

To a degree such passenger acceptance will be related to the fact that a passenger can easily determine that food and beverages being served are at the proper temperature by seeing service units such as the service units 60F in use. In other words, a passenger being served with a portion of meat will know from seeing the service unit 60F that this portion is served under such temperature conditions as to be desirable. With the invention this type of result is achieved with a comparative minimum of labor.

Because of the nature of the serving units 60L and 60F, no one need carry food or beverage items from a completely separate galley to the passengers' seats. As a result of this a person will be able to serve more passengers within a limited time interval using a service unit 60L or 60F than possible with prior food and beverage service arrangements used within aircraft.

The service units 60L and 60F are also advantageous for another type of reason. Different types of passengers, as for example passengers of different nationalities and/or religious backgrounds may have entirely different preferences as to food and refreshment. The present invention is of such a character that different types of food items can be carried on individual service unit 60F so that the passenger is being served he or she may obtain a desired type of food with a minimum of difficulty. Also, different of the service units 60F may contain entirely different types of food in order to comply with dietary and related problems.

From a detailed consideration of this description, it will be apparent to those skilled in the field of providing food and beverage service in aircraft that this invention may be employed in a number of different ways through the use of routine skill in this field.

I claim:

1. In an aircraft having a fuselage containing an upper deck and a lower deck, the upper deck being adapted to carry passengers, the improvement which comprises:

a kitchen located on the lower deck *for the storage and preparation of beverage and individual servings of food items to be served to passengers on the upper deck,* a service module located above said kitchen on the upper deck, said service module dividing said aircraft into separate passenger areas,

*a plurality of temperature controllable serving units normally carried in said kitchen, said serving units having wheels and being adapted to contain said items to be served to passengers in said aircraft,* elevator means disposed within said service module [for] *and* connecting said kitchen and said service module *for providing a passage for aircraft passenger service personnel between decks during the course of a flight and for prepositioning individual serving units* [whereby items] from said kitchen [are prepositioned] within said service module *at passenger deck level* [by said elevator means],

[a plurality of serving units normally carried in said kitchen, each of said serving units have wheels and being adapted to contain items to be served to passengers in said aircraft], said serving units being capable of being transported from said kitchen to said service module through said elevator means and being adapted to be stored within said elevator means *at either deck level* and being further adapted to permit *said* items held by said serving units to be dispensed to the passengers within said aircraft when said serving unit is in situ within said service module and when circulated among passengers, *and*

*built-in cold storage means and built-in oven means located within said kitchen separate from said serving units for use by said personnel in the performance of food and beverage storage and preparation tasks.*

2. An aircraft as claimed in claim 1 wherein:

said serving units are normally located within said kitchen in a sequential manner corresponding to the sequence in which said serving units are to be used.

3. An aircraft as claimed in claim 1 including:

cold storage means and oven means located within said kitchen adjacent said elevator means so as to be accessible to said serving units as said serving units are being removed from said kitchen to be transported to said serving module through said elevator means so that items can be moved from said cold storage means and said oven means to said serving units.

4. An aircraft as claimed in claim 1 wherein:

some of said serving units are beverage serving units and the other of said serving units are food serving units, said beverage serving units comtaining beverages, said food serving units containing food items.

5. An aircraft as claimed in claim 1 wherein:

at least some of these serving units are food serving units, each of said food serving units including:

a housing having a plurality of drawers located therein, said drawers being adapted to contain trays to be dispensed to passengers within said aircraft, said housing including refrigeration means for cooling trays located upon said drawers within said housing.

6. An aircraft as claimed in claim 5 wherein each of said food serving units also includes:

another housing having a plurality of drawers located therein.

7. An aircraft as claimed in claim 6 including:

separate cold storage units and oven means located within said kitchen adjacent to said elevator means so as to be accessible to said food serving units when said food serving units are being removed from said kitchen to be transported to said serving module through said elevator means so that items can be removed from said cold storage units and said oven means to said food serving units, said refrigeration means serving to maintain the items so removed at less than an ambient temperature within said aircraft, said heating means serving to maintain items so removed at an elevated temperature above the ambient temperature within the aircraft.

8. An aircraft as claimed in claim 1 wherein:

said serving units are adapted to be located in areas of said aircraft which are not in use during the flight of said aircraft as other of said serving units are circulated on said upper deck.

9. An aircraft as claimed in claim 1 including:

trash chute means associated with said elevator means, said trash chute means being capable of receiving trash from the upper deck of said aircraft and compacting such trash within the lower deck of said aircraft as said elevator means is operated.

10. An aircraft as claimed in claim 9 including:

compactor means located on said elevator means for compacting trash, as said elevator means are moved downward.

11. An aircraft as claimed in claim 1 wherein said kitchen further comprises a separate entrance in said lower deck, said separate entrance adaptable to ground loading and unloading at a location separate and distinct from the passenger loading entrance.

12. In an aircraft an improved food and beverage service system comprising:

an aircraft having a fuselage, said fuselage being divided into an upper deck and a lower deck, a kitchen disposed in said lower deck and located below the floor of said upper deck and between the side walls of said fuselage, said kitchen comprising food preparation and storage areas *including oven and cold storage means* and having a separate entrance below said upper deck for loading and unloading said kitchen, a service module located above said kitchen on said upper deck, said service module dividing said aircraft into separate passenger areas, elevator means disposed within said service module for connecting said kitchen and said service module whereby *prepared food* items *in individual serving portions* from said kitchen in said lower deck are prepositioned on said upper deck within said service module by said elevator means *and for providing a passage through which personnel may move between decks,*

[[*ladder means disposed between said upper deck and said lower deck for emergency egress,*]] *and* a plurality of wheeled serving units normally sequentially positioned in said kitchen, said serving units adapted to contain *said food* items to be served to passengers in said upper deck of said aircraft, said serving units adapted to be transported from said kitchen to said service module and be circulated among the passengers in said upper deck of said aircraft to permit items contained therein to be dispersed to the passengers.

* * * * *